United States Patent [19]

Pirolli et al.

[11] Patent Number: 4,761,652
[45] Date of Patent: Aug. 2, 1988

[54] ARRANGEMENT FOR MEASURING THE DISTANCE SEPARATING THE ARRANGEMENT FROM A MOVING BODY

[75] Inventors: Claude Pirolli, Rueil Malmaison; Jean-Pierre Fouilloy, Velizy, both of France

[73] Assignee: U.S. Philips Corporation, New York, N.Y.

[21] Appl. No.: 924,546

[22] Filed: Oct. 29, 1986

[30] Foreign Application Priority Data

Oct. 29, 1985 [FR] France .................................. 85 16042

[51] Int. Cl.$^4$ ......................... G01S 13/08; G01S 13/86
[52] U.S. Cl. ...................................... 342/53; 342/126; 102/427
[58] Field of Search ..................... 342/109, 111, 52, 53, 342/68, 69, 117, 458, 118, 126; 102/213, 214, 427

[56] References Cited

U.S. PATENT DOCUMENTS 3,010,102 11/1961 Ketchledge et al. .................. 342/53
4,118,702 10/1978 Rabinow ................................. 342/68
4,268,167 5/1981 Alderman ........................... 342/458 X

FOREIGN PATENT DOCUMENTS 2108244 5/1983 United Kingdom ................. 102/427

Primary Examiner—T. H. Tubbesing
Assistant Examiner—Gilberto Barrón, Jr.
Attorney, Agent, or Firm—Robert J. Kraus

[57] ABSTRACT

A distance-measuring arrangement including transmission means for transmitting a wave in a measuring field, receiving means for receiving the wave reflected from a moving body moving in the measuring field and for producing a beat signal from the Doppler frequency. Delimiting means is provided for forming, in the measuring field, at least two datum lines (Ca and Cb) and processing means is provided for processing the distance information obtained from measuring the Doppler frequencies at the instants when the moving body crosses the datum lines. The delimiting means are formed from thermal detectors disposed in an optical assembly having at least two optical axes for defining the datum lines. A timing circuit is provided for defining the instants at which the moving body crosses the datum lines and for applying this information to the processing means.

5 Claims, 6 Drawing Sheets

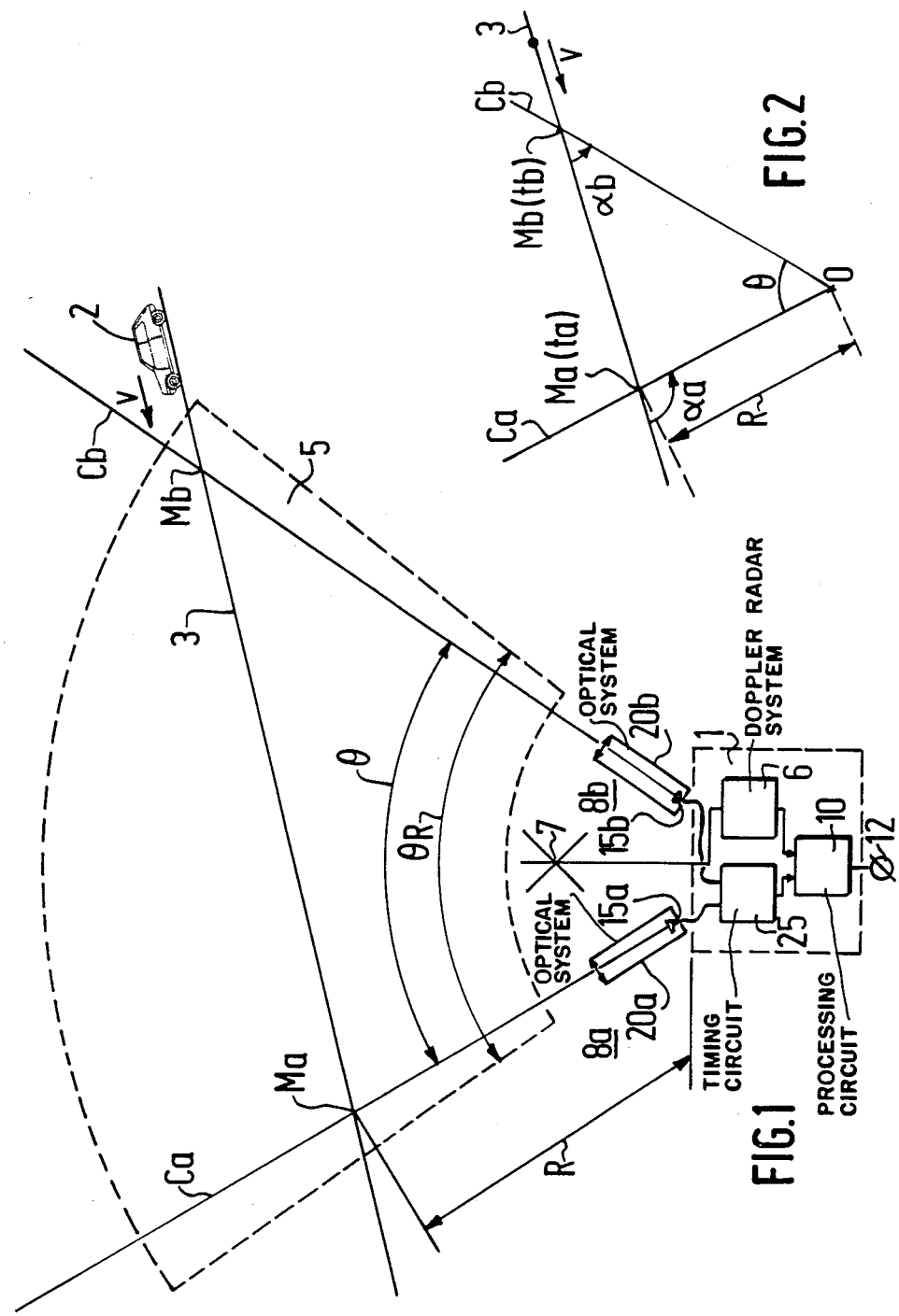

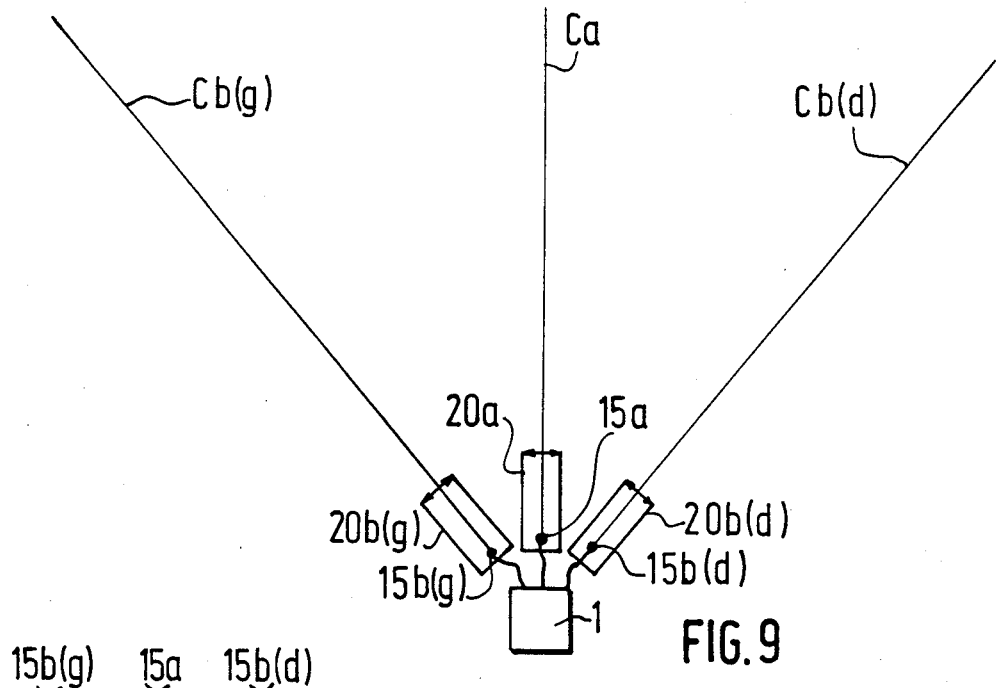
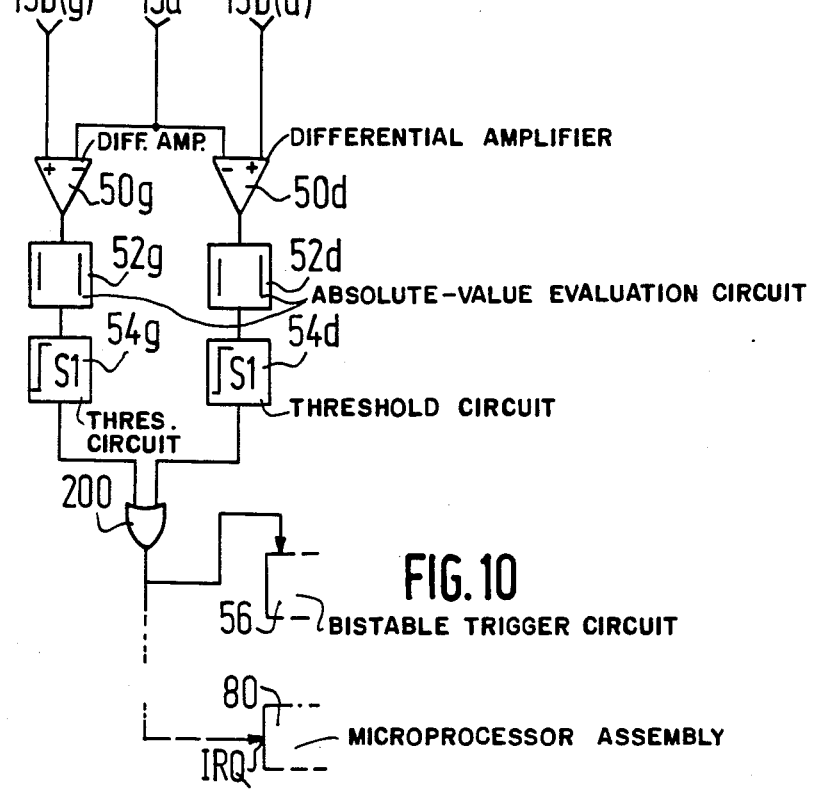

4,761,652

ARRANGEMENT FOR MEASURING THE DISTANCE SEPARATING THE ARRANGEMENT FROM A MOVING BODY

BACKGROUND OF THE INVENTION

The invention relates to an arrangement for measuring the distance separating the arrangement from a moving body. The arrangement comprises transmission means for transmitting a wave in a measuring field, receiving means for receiving the wave reflected from the moving body moving in the measuring field and also for supplying a beat signal at the Doppler frequency, delimiting means for providing in the measuring field at least two datum lines, and processing means for processing the distance data obtained from the Doppler frequency measurement when the moving body crosses the datum lines.

German patent applications Nos. 2,315,815, 2,315,816 and 2,365,765 disclosed such an arrangement. That arrangement is installed on a moving body and is used in a control for keeping the moving body at a fixed distance from a rail by means of electromagnetic suspension. The distance measuremeent is derived from the Doppler frequencies at instants defined by datum lines obtained with the aid of a laser beam transmitted from the moving body and reflecting from reflectors disposed equidistantly along the rail.

This arrangement requires the presence of elements (the reflectors) arranged opposite each other. There are certain uses for which the presence of these facing elements is not tolerated. That is the, for example, when the arrangement is used for triggering a mine when a nearby vehicle passes the mine. It is then important for the arrangement to be unobtrusive, which excludes the presence of external objects for cooperation with the arrangement. It should be noted that, for that type of usage, the distance measurement is indispensable so as to ensure that the mine is not triggered until the vehicle enters its effective range.

SUMMARY OF THE INVENTION

In accordance with the invention, an arrangement for measuring the distance separating it from a moving body is characterized in that the delimiting means are controlled by thermal detectors disposed in an optical assembly having optical axes defining the datum lines and in that a timer circuit is provided for defining the instants at which the moving body crosses the datum lines and for supplying that information to the processing means.

In a preferred embodiment a starter means is provided which is controlled by thermal detectors such that the transmission means are not triggered until the moving body crosses the datum line in one direction. This embodiment has the advantage that the arrangement can then be substantially undetectable. When no vehicle is passing, it behaves in a passive manner, that is to say it does not transmit any radiation.

BRIEF DESCRIPTION OF THE DRAWING

The following drawing figures, and description of the exemplary embodiments illustrated thereby will make it better understood how the invention can be put into effect:

FIG. 1 is a schematic representation of an arrangement for range measurement according to the invention.

FIG. 2 is a diagram intended to make it better understood how the arrangement according to the invention operates.

FIG. 9 shows an arrangement for range measurement for which datum lines are provided. FIG. 10 shows the modification made as a result of the circuit diagram of FIG. 3.

DESCRIPTION OF THE PREFERRED EMBODIMENTS

Figure 3:
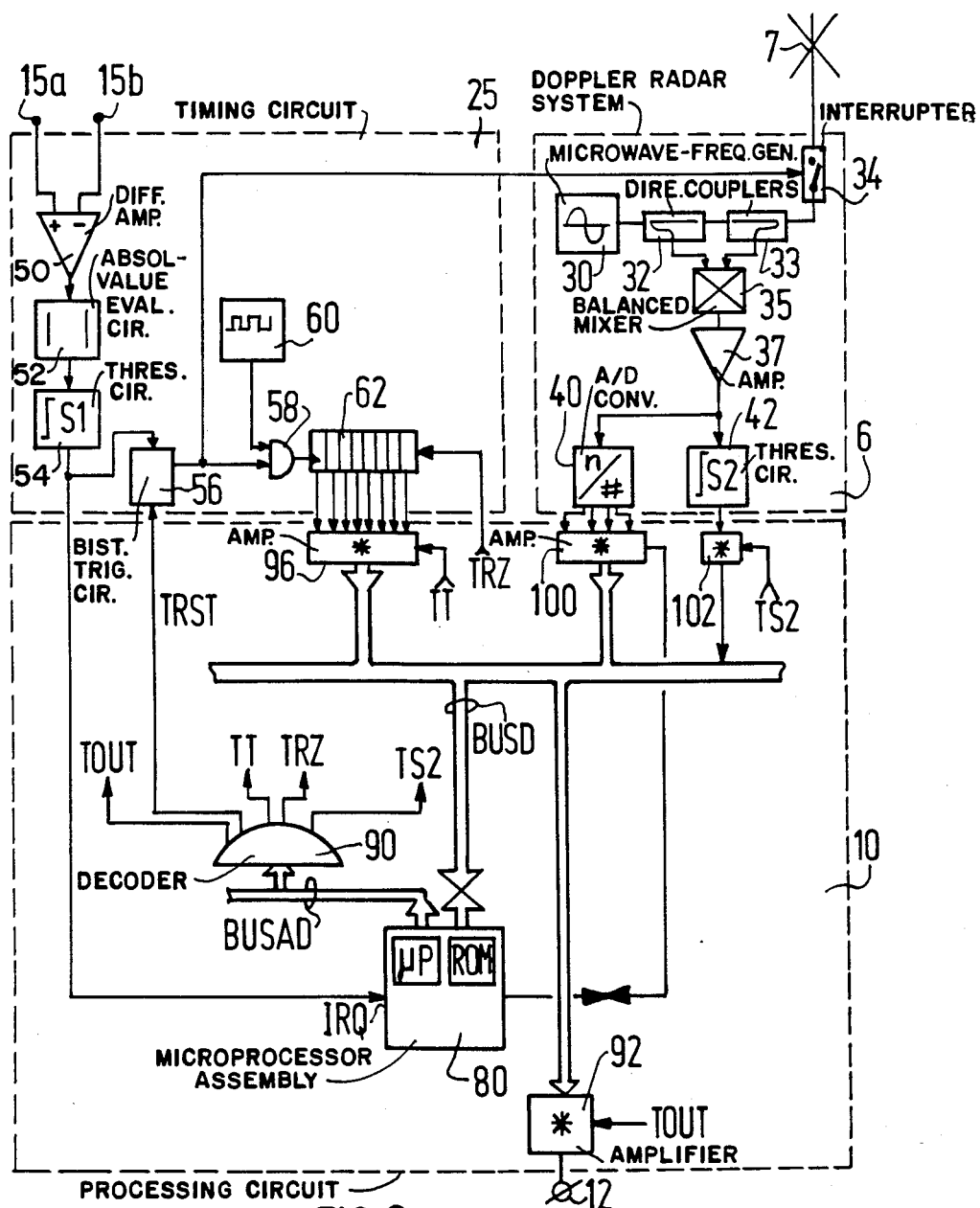
FIG. 3 shows an embodiment of the arrangement for range measurement in accordance with the invention.

In FIG. 1 the arrangement according to the invention is denoted by reference numeral 1. The moving body 2, a road vehicle for example, moves at a speed (V) along a path 3 which is assumed to be straight. This path enters, as shown in FIG. 1, the measuring field 5 of the arrangement This measuring field is actually defined by the range of a Doppler radar system 6, which forms part of the arrangement 1 and transmits and receives electromagnetic waves via a transmitting-receiving aerial 7. The width of the radiating lobe of this aerial 7 is $\theta R$. With the aid of the delimiting means constituted more specifically by the arrangements 8a and 8b, reference lines, which are shown as two straight lines Ca and Cb and will be designated datum lines are created in this field of action.

These lines enclose an angle $\theta$ whose apex is located at the level of the arrangement 1. The path 3 cuts the datum lines Ca and Cb at the respective points Ma and Mb. A processing circuit 10 supplies at the terminal 12 an indication of the distance R between the point Ma and the arrangement 1. This distance is determined more specifically by the Doppler frequencies produced by the Doppler radar system 6.

In accordance with the invention, the arrangements 8a and 8b are formed from thermal detectors 15a and 15b which are disposed in an optical assembly constituted by two optical systems 20a and 20b, whose optical axes define the datum lines. A timing circuit 25 is provided for defining the instants at which the datum lines are crossed and for applying this information to the processing circuit 10.

The operating principle of the invention is based on the following considerations.

Reference is made to FIG. 2. The point O indicates the location of the arrangement 1. The path 3 intersects the straight lines Ca and Cb in the points Ma and Mb, forming the respective angles $\alpha a$ and $\alpha b$. The instants at which the moving body 2 crosses the lines Cd and Ca is denoted by Tb and Ta.

When the moving body crosses the line Cb, the Doppler effect causes a frequency difference fb between the transmitted wave whose wavelength is $\lambda$, and the received wave:

$$fb = \frac{2v}{\lambda} \cos(ab)$$

When the moving body crosses the line Ca the frequency difference fa is written:

$$fa = \frac{2v}{\lambda} \cos(aa)$$

Noting hat:

$$(aa)-(ab)=\theta$$

and when thereafter $\theta$ is assumed to be small, it is possible to write that:

$$fa - fb \simeq -\frac{2v}{\lambda} \cdot \theta \cdot \sin(ab)$$

$$\frac{MaMb}{\sin\theta} = \frac{R}{\sin(ab)}$$

so that $$R \simeq \frac{\lambda}{2} \cdot \frac{(ta-tb)}{\theta} \cdot \frac{fb-fa}{\sin\theta}$$

The symbols $\simeq$ mean: approximately equal.

FIG. 3 illustrates in detail a practical embodiment of the arrangement 1.

The radar system 6 is constituted by a microwavefrequency generator 30 producing a continuous wave of 15000 MHz; this wave is transmitted to the transmitting-receiving aerial 7 passing, in sequence, through a first directional coupler 32, a second directional coupler 33 and an interrupter 34 constituted by a PIN diode. A balanced mixer circuit 35 effects matching of the direct wave obtained by means of the coupler 32 and the reflective wave obtained via the coupler 33. After amplification by an amplifier 37, a beat signal is obtained of the frequency provided by the Doppler effect and having an appropriate amplitude for being encoded in digital form by the analog-to-digital converter 40. A threshold circuit 42 produces at its output a signal indicating that the moving body 2 is of a certain importance which corresponds to a predefined amplitude of the signal at the output of the amplifier 37.

The timing circuit 25 is formed in the following manner. The output wires of the thermal detectors are connected to the (+) and (−) inputs, respectively, of a differential amplifier 50. An absolute value evaluation circuit 52, whose input is connected to the output of this amplifier 50 produces a signal whose amplitude depends on the amplitude of the output signal but not on its sign. A threshold circuit 54 connected to the output of the circuit 52 does not supply an active signal from its output before the amplitude of the signal applied to its input is of a sufficiently high value. This active signal sets a bistable trigger circuit 56 to the "1" state. The output signal of this bistable trigger circuit opens or closes, depending on its state, a dual-input AND-gate 58. The periodic signals continuously transmitted by a clock circuit 60 are applied to a counting input of a counter 62 via this gate 58 only when the output signal of the bistable trigger circuit 56 allows this.

Attention is drawn to the connection between the output of the bistable trigger circuit 56 and a control input of the interrupter 34. The interrupter 34 is closed (the antenna 10 then radiates) when the gate 58 is conductive, which corresponds to passing of the moving body 2 between the two datum lines Ca and Cb; that is to say the arrangement only radiates for the period of time necessary to measure the distance.

The processing circuit 10 is built-up around a microprocessor assembly 80 which is basically formed by the actual microprocessor MP, for example the TMS 32010 manufactured by TEXAS INSTRUMENTS, and a read-only memory ROM containing the instructions which manage the overall operation of the arrangement. The assembly 80 communicates with the exterior via the common lines BUSAD and BUSD. The bi-directional bus line BUSD is used to convey data to the exterior and for receiving data from the exterior; the line BUSAD is employed for transmitting the address code. A decoder 90 decodes some of these address codes for processing different control signals TOUT, TRST, TT, TRZ, TS2. The control signals TOUT, TT and TS2 are applied to respective control inputs (open state—conductive state) of threestage amplifiers 92, 96 and 102 connected to the BUSD line. Via its terminal 12, the amplifier 92 supplies the indication of the distance. The inputs of the amplifier 96 receive the signals containing the contents of the counter 62. The output of the gate 58 is connected to the reset-to-zero control of the counter 62. The control signals TRST and TRZ are directly applied to the reset-to-zero input of the bistable trigger circuit 56 and of the counter 62. The input of the amplifier 102 is connected to the input of the threshold circuit 42. It should be noted that a three-stage amplifier assembly is present which is connected directly to the microprocessor assembly 80 in a manner described in an article to be described hereinafter.

The arrangement operates in the following manner. Let it first be assumed that the interrupter 34 is open and that the vehicle 2 moves from right to left (see FIG. 1). When the vehicle crosses the line Cb, the detector 15b detects this crossing; there is consequently an unbalance at the input of the differential amplifier 50 (FIG. 3); whatever the sign of this unbalance, only its amplitude is considered at the output of the evaluation circuit 52. Finally, the threshold circuit 54 supplies an active signal from its output. This has two consequences: the first consequence is that the bistable trigger circuit 56 changes state which causes the interrupter 34 to close and also causes the counting pulses of the clock circuit 50 for the counter 62 to pass through the gate 58; the second consequence is that an active signal is applied to the input IRQ for interrupting the assembly 80, which triggers an interruption program which will be examined in greater detail.

Inside the Doppler radar system 6, the beat wave at the output of the amplifier 37 is covered by the A/D converter 40 for processing by the assembly 10, and thus supplies data on the speed of the vehicle 2 when it crosses the line Cb. Thereafter the vehicle 2 crosses the line Ca. An active signal appears at the output of the circuit 54; this signal has no effect whatsoever on the bistable trigger circuit 56 but in the assembly 80 triggers the second portion of the interrupt program to be described hereinafter. This second portion has for its object to determine the speed of the vehicle on crossing of the line Ca and also to calculate the distance R. This portion of the program also determines some additional functions such as, for example, resetting the bistable trigger circuit 56 and the counter 96 to zero. On the other hand it is possible to use the signal at the output of the threshold circuit 42 for validating or non-validating the result of the measurement of R.

Figure 4A:
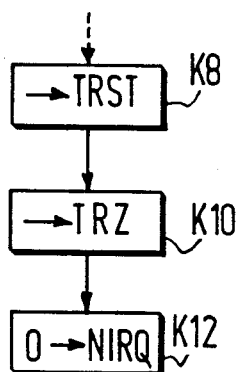
FIG. 4a and 4b are flow charts for a microprocessor arrangement forming part of the arrangement of FIG. 3.
Figure 4B:
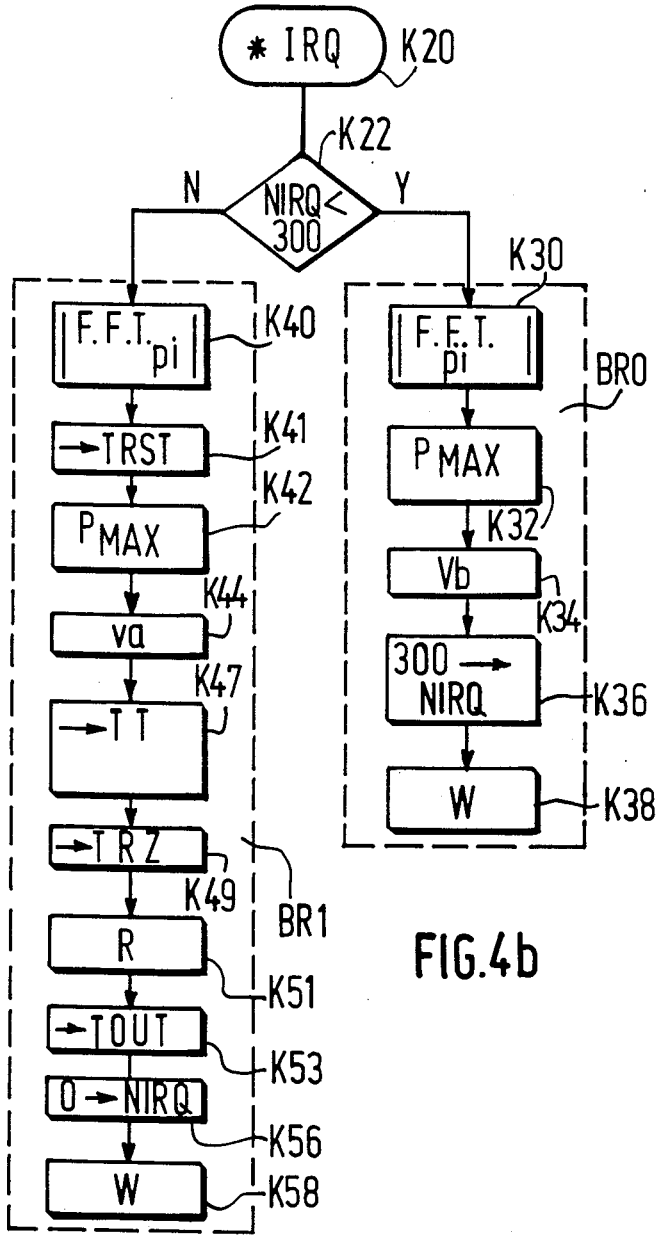

The flow chart representing the mode of operation of the assembly 80 is shown in FIGS. 4a and 4b. FIG. 4a illustrates the starting phase triggered by starting of the arrangement. The box K8 in FIG. 4a indicates that the signal TRST has been activated; to that end a predefined address code is generated on the line BUSAD. This predefined code is recognized by the decoder 90 as a result of which the signal TRST is activated to reset the bistable trigger circuit 56 to the "0" state. The box K10 in FIG. 4a indicates that the signal TRZ is activated; to that end a different, predefined address code is generated on the line BUSAD. This predefined, other code, recognized by the decoder 90, activates the signals TRZ. In response thereto the contents of the counter 62 is reset to zero. In box K12 it is indicated that the contents of a memory location (location designated NIRQ) situated inside the assembly 80 is reset to zero. Starting the program whose flow chart is represented in FIG. 4b is triggered by the pulses producing the interrupts. This is indicated by box K20. The program starts by testing the contents of the location NIRQ (box K22). If this content is less than a value of, for example, 300 the program branch BR0 is executed, if not the program branch BR1 is executed. The program branch BR0 starts in box K30 which illustrates a fast Fourier transform. All details of this procedure in which the analog-to-digital converter 40 participates, can be found in a publication by TEXAS INSTRUMENTS entitled "Signal Processing with the TMS 320", in the article: "Signal Processing $\mu$C builds FFT-based Spectrum analyzer", pages 21–26. The different samples denoted Pi resulting from this conversion, for example 256 samples, are stored in the internal memory in such a way that the most significant sample $p_{MAX}$ can be determined (bos K32). From there, it is possible to calculate (box K34) the value Vb which is stored in the memory. Thereafter, the value 300 is stored in the location NIRQ (box K36). Finally, this program branch ends with a phase in which the next interrupt pulse is waited for.

This next interrupt pulse enables the start of the program branch BR1 since the test indicated in box K22 is negative. In this branch the same operations indicated in the boxes K30 and K32 are performed (in this branch BR1 they are given the reference numerals K40 and K42). However, an additional operation is inserted (box K41). This operation consists in resetting the bistable trigger circuit 56 to zero. Box K44 indicates calculation of the velocity Va. Thereafter the contents of the counter 62 is read (box K47). To that end the signal TT is activated; this content is required for calculating the value R (box K51); this value can ultimately be conveyed to the terminal 12 and for that purpose the signal TOUT is activated (case K53). Thereafter a "0" is stored in the memory location having reference numeral NIRQ (box K56) and finally one proceeds to the waiting phase K58. The subsequent interrupt code will then trigger the start of the program branch BR0.

Figure 5:
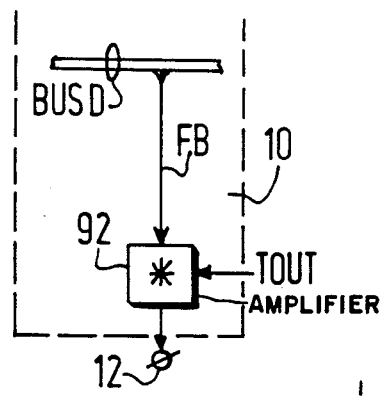
FIG. 5 shows how the arrangement of FIG. 3 can be modified to be capable of triggering a mine.
Figure 6:
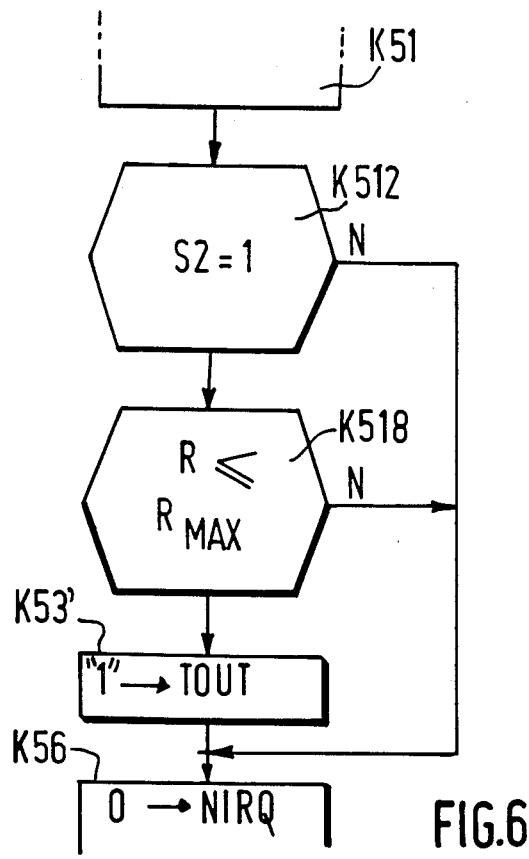
FIG. 6 shows the relevant modification made in the flow chart of FIG. 4b.

When the arrangement is of a type used to trigger a mine as described hereinbefore, the amplifier 92 may be connected to one single wire FB of the line BUSD, as indicated in FIG. 5, instead of to all the wires of this line. In order to activate this signal it must first satisfy certain tests. This is illustrated in FIG. 6 where it is shown that these tests are inserted between the boxes K51 and K53 of the flow chart of FIG. 4b. These five tests are represented by the boxes K512 and K518.

In box K512, it is tested whether the level of the beat signal has an adequate value, which means that the value of the output signal of the threshold circuit 42 is tested.

Finally, thereafter the value R just calculated is compared to a value $R_{MAX}$ *which gives the range in which the explosive triggered by the arrangement according to the invention is effective. If R is less than the value $R_{MAX}$* then box K53' signifies that an active signal "1" is supplied from the terminal 12.

It should be noted that if one of the tests indicated in the boxes K512 and K518 is negative, the box K56 is proceeded to, which actually means the arrangement is reset to the initial state.

Figure 7:
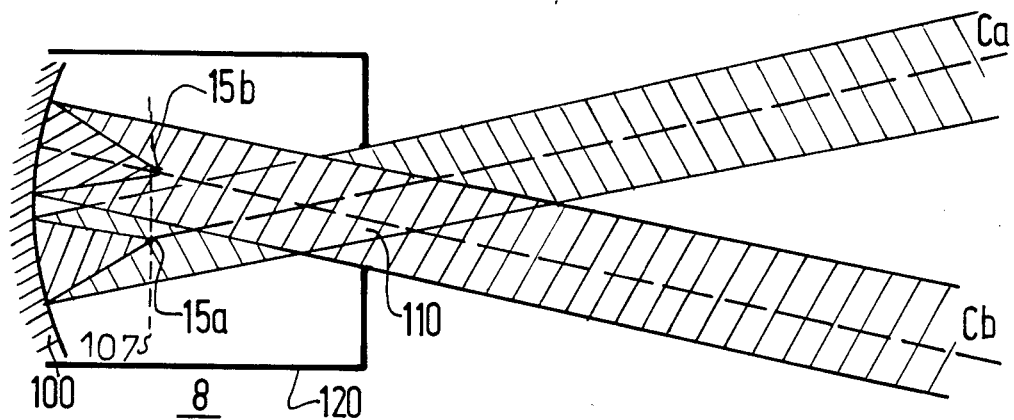
FIG. 7 shows an embodiment of the delimiting means.

In FIG. 7 a preferred embodiment is illustrated of an arrangement 8 for producing the datum lines. In this arrangement of FIG. 7 the thermal detectors, which are always given the reference numerals 15a and 15b, are disposed in the focal plane 107 of a reflecting concave surface, so that a beam centered on the line Ca will converge at the detector 15a passing through an aperture 110 made in a casing 120 which protects the assembly, and that another beam centered on the line Cb converges at the detector 15b.

Figure 8:
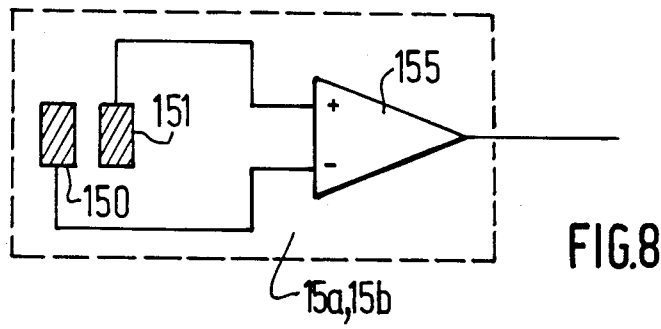
FIG. 8 shows an assembly of thermal detector elements suitable for use in the delimiting means.

FIG. 8 shows a possible construction of the thermal detector. The reference numerals 150 and 151 denote the thermal radiation-sensitive elements; an output signal is applied to a differential amplifier 155 so that the output signal is insensitive to thermal fluctuations of the two elements 150 and 151 and to fluctuations in the radiation (and in general to all the parasitics having similar negative influences on the two detectors).

FIG. 9 shows an arrangement in accordance with the invention in which the vehicle may suddenly appear either to the right or to the left of the line Ca. To that end, a second line Cb(g) is established in addition to the datum line Cb(d) located at the right. It is possible to associate with these lines Cb(g), Ca, Cb(d) optical assemblies 20b(g), 20a and 20b(d) with the detectors 15b(g), 15a and 15b(d), or, as shown in FIG. 7, it is equally possible to dispose three of the detector elements in the focal plane of the surface 100.

FIG. 10 shows how the input signals of these different output elements are employed. The output signals of the elements 15a and 15b(d) are applied to (−) and (+) inputs of a differential amplifier 50d followed by an absolute-value evaluation circuit 52d and a threshold circuit 54d. In a similar manner the output signals of the elements 15a and 15(g) are applied to (−) and (+) inputs of the differential amplifier 50g which is followed by an absolute-value evaluation circuit 52g and a threshold circuit 54g. An OR-gate takes the signals from the outputs of the circuit 54g and 54d to apply them to the bistable trigger circuit 56 and to the microprocessor assembly 80.

What is claimed is:

1. An arrangement for measuring the distance to a moving object when said object enters a measuring field, said arrangement comprising:
   a. transmitting means for transmitting a wave into the measuring field;
   b. receiving means for receiving a doppler-shifted reflection of the wave from the moving object and for producing a beat signal having a frequency representative of at the doppler frequency;
   c. delimiting means including (1) an optical arrangement for sequentially receiving thermal radiation along first and second separated paths having respective central axes defining in the measuring field first and second datum lines and (2) first and second thermal detectors disposed in the optical arrangement for detecting thermal radiation received along respective ones of said axes;

d. timing circuitry electrically connected to the thermal detectors for producing first and second signals indicating when the moving object crosses the respective axes; and e. processing means electrically connected to the receiving means and to the timing circuitry for determining said distance from the doppler frequency and the timing of the first and second signals.

2. An arrangement as in claim 1 including triggering means electrically connected to at least one of the thermal detectors and to the transmitting means for activating transmission of the wave when the moving object crosses the respective datum line.

3. An arrangement as in claim 1 or 2 where the optical arrangement comprises convergence means for converging thermal radiation received along the first and second paths to focal points lying on a predefined focal plane, said first and second thermal detectors being disposed at respective ones of said focal points.

4. An arrangement as in claim 1 or 2 where the processing means is adapted to determine the distance to the moving object by performing the following calculation:

$$R = \lambda/2 \frac{(t_a - t_b)}{\theta} \cdot \frac{(f_b - f_a)}{\sin\theta}$$

where:
  R is the distance to the moving object;
  $\lambda$ is the wavelength of the transmitted wave;
  $(t_a - t_b)$ is the time interval separating the instants at which the moving body crosses the two datum lines;
  $(f_b - f_a)$ are the doppler frequencies of the reflected waves received when the moving body is crossing the respective datum lines; and
  $\theta$ is a predefined angle between the first and second datum lines.

5. An arrangement as in claim 1 or 2 where the processing means comprises a doppler-frequency spectrum analyzer and where the arrangement comprises means for producing a signal for effecting operation of an auxiliary means only when:

a. the distance R is no larger than a predetermined value $R_{MAX}$; and b. the magnitude of the beat signal is at least equal to a threshold level.

* * * * *